US012766618B2

(12) United States Patent
Marich et al.

(10) Patent No.: US 12,766,618 B2
(45) Date of Patent: Oct. 20, 2026

(54) ACCESSORY FOR AN OSCILLATING POWER TOOL

(71) Applicant: MILWAUKEE ELECTRIC TOOL CORPORATION, Brookfield, WI (US)

(72) Inventors: Milorad Marich, Mequon, WI (US); Jason M. Thom, Wauwatosa, WI (US); Zachary D. Bernaden, Milwaukee, WI (US); Jonathan G. Winter, Burlington, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 938 days.

(21) Appl. No.: 17/799,342

(22) PCT Filed: Feb. 4, 2021

(86) PCT No.: PCT/US2021/016501
§ 371 (c)(1),
(2) Date: Aug. 12, 2022

(87) PCT Pub. No.: WO2021/162921
PCT Pub. Date: Aug. 19, 2021

(65) Prior Publication Data
US 2023/0082304 A1 Mar. 16, 2023

Related U.S. Application Data

(60) Provisional application No. 62/975,437, filed on Feb. 12, 2020.

(51) Int. Cl.
*B23D 61/00* (2006.01)
*B23D 51/14* (2006.01)
(Continued)

(52) U.S. Cl.
CPC ........... *B23D 61/006* (2013.01); *B23D 51/14* (2013.01); *B23D 51/16* (2013.01); *B23D 59/0064* (2024.05); *B25F 3/00* (2013.01)

(58) Field of Classification Search
CPC .............. B23D 61/006; B23D 59/0064; B23D 59/006; B23D 61/025; B23D 61/06; B27B 19/008; B27B 19/006; B23Q 11/046
See application file for complete search history.

(56) References Cited

U.S. PATENT DOCUMENTS 5,087,261 A * 2/1992 Ryd ..................... A61B 17/144
606/177
5,122,142 A * 6/1992 Pascaloff ............. A61B 17/142
D24/146
(Continued)

FOREIGN PATENT DOCUMENTS

DE 10325392 A1 * 12/2004 ............. A61B 17/14
DE 10230255 B4 2/2006
(Continued)

OTHER PUBLICATIONS

International Search Report and Written Opinion for Application No. PCT/US2021/016501 dated May 24, 2021 (10 pages).
(Continued)

*Primary Examiner* — Jennifer S Matthews
(74) *Attorney, Agent, or Firm* — Michael Best & Friedrich LLP

(57) ABSTRACT

An accessory for use with an oscillating power tool. The accessory includes an attachment portion including a mounting aperture arrangement configured to couple with the oscillating power tool. The accessory also includes a body extending away from the attachment portion in a longitudinal direction defining a longitudinal axis, a distal end portion including a generally planar surface and a cutting edge configured to perform a material-removing operation, and a
(Continued)

conduit extending from proximate the cutting edge towards the attachment portion. The conduit is configured to convey material removed during the material-removing operation towards a vacuum system.

20 Claims, 12 Drawing Sheets

(51) Int. Cl.

| | |
|---|---|
| ***B23D 51/16*** | (2006.01) |
| ***B23D 59/00*** | (2006.01) |
| *B25F 3/00* | (2006.01) |

(56) References Cited

U.S. PATENT DOCUMENTS

| | | | | |
|---|---|---|---|---|
| 5,919,085 | A | 7/1999 | Izumisawa | |
| 6,648,742 | B1 | 11/2003 | Segiel, Jr. | |
| 6,835,030 | B2 | 12/2004 | Pozgay et al. | |
| 7,854,649 | B2 | 12/2010 | Bohne et al. | |
| 8,800,682 | B2 | 8/2014 | Walker | |
| 9,393,658 | B2 | 7/2016 | Walker et al. | |
| 9,452,502 | B1 | 9/2016 | Jones | |
| 9,555,554 | B2 * | 1/2017 | Thorson | B24B 23/04 |
| 2014/0327215 | A1 | 11/2014 | Thorson et al. | |
| 2014/0378034 | A1 | 12/2014 | Clabunde | |
| 2015/0050093 | A1 | 2/2015 | Deland et al. | |
| 2019/0111581 | A1 | 4/2019 | Levsen | |

FOREIGN PATENT DOCUMENTS

| | | | | |
|---|---|---|---|---|
| DE | 102015012599 | A1 | 3/2017 | |
| EP | 2366498 | B1 | 5/2015 | |
| EP | 3269502 | A1 | 1/2018 | |
| EP | 3269503 | A1 | 1/2018 | |
| JP | H05162013 | A | 6/1993 | |
| JP | 2011051333 | A | 3/2011 | |
| JP | 5359066 | B2 | 12/2013 | |
| JP | 3218922 | U | 11/2018 | |
| KR | 100696720 | B1 | 3/2007 | |
| WO | 8909028 | A1 | 10/1989 | |
| WO | WO-9415538 | A1 * | 7/1994 | A61B 17/14 |
| WO | 2013093191 | A1 | 6/2013 | |
| WO | 2018010854 | A1 | 1/2018 | |
| WO | 2018011194 | A1 | 1/2018 | |
| WO | 2018104016 | A1 | 6/2018 | |
| WO | 2018104018 | A1 | 6/2018 | |
| WO | 2018104057 | A1 | 6/2018 | |
| WO | 2018104098 | A1 | 6/2018 | |
| WO | 2018192869 | A2 | 10/2018 | |
| WO | 2019029998 | A1 | 2/2019 | |

OTHER PUBLICATIONS

Milwaukee Electric Tool Corp., “M18 Oscillating Multi-Tool Dust Extractor Kit,” available at <https://www.homedepot.com/p/Milwaukee-M18-Oscillating-Multi-Tool-Dust-Extractor-Kit-49-90-2400/204635652> web page visited Jan. 18, 2021.

Dremel, “Dremel Edge MM400E Starter Cutting Kit,” <https://www.ebay.com/itm/DREMEL-EDGE-MM400E-STARTER-CUTTING-KIT-/392732807838> web page visited Aug. 16, 2022.

Chinese Patent Office Action for Application No. 202180008945.6 dated Apr. 26, 2024 (13 pages including English translation).

Extended European Search Report for Application No. 21753145.8 dated Jan. 30, 2024 (7 pages).

* cited by examiner

ACCESSORY FOR AN OSCILLATING POWER TOOL

CROSS-REFERENCE TO RELATED APPLICATION

This application is a national stage filing under 35 U.S.C. § 371 of International Application No. PCT/US2021/016501 filed on Feb. 4, 2021, which claims priority to U.S. Provisional Patent Application No. 62/975,437 filed on Feb. 12, 2020, the entire contents of which are incorporated herein by reference.

BACKGROUND

The present disclosure relates to a blade for power tools, and more particularly to a blade for an oscillating power tool.

SUMMARY

In one aspect, the disclosure provides an accessory for use with an oscillating power tool. The accessory includes an attachment portion including a mounting aperture arrangement configured to couple with the oscillating power tool. The accessory also includes a body extending away from the attachment portion in a longitudinal direction defining a longitudinal axis, a distal end portion including a generally planar surface and a cutting edge configured to perform a material-removing operation, and a conduit extending from proximate the cutting edge towards the attachment portion. The conduit is configured to convey material removed during the material-removing operation towards a vacuum system.

In another aspect, the disclosure provides an accessory for use with an oscillating power tool. The accessory includes an attachment portion including a mounting aperture arrangement configured to couple with the oscillating power tool, a vacuum aperture, a body extending from the attachment portion in a direction defining a longitudinal axis, and a distal end region. The distal end region includes a generally planar surface and a cutting edge configured to perform a material-removing operation. The accessory also includes a conduit in fluid communication with the vacuum aperture and configured to convey material removed during the material-removing operation towards the vacuum aperture.

In yet another aspect, the disclosure provides an accessory for use with an oscillating power tool. The accessory includes an elongated body defining a longitudinal axis extending between a first end and a second end, an attachment portion disposed proximate the first end and including a mounting aperture arrangement configured to couple with the oscillating power tool, and a distal end portion disposed proximate the second end generally opposite the attachment portion. The distal end portion includes a cutting edge configured to perform a material-removing operation. The accessory also includes a conduit extending from proximate the cutting edge towards the attachment portion and configured to convey material removed during the material-removing operation towards a vacuum system.

In another aspect, the disclosure provides a blade for use with an oscillating power tool and with a vacuum system for removing material. The blade includes an attachment portion and a body extending from the attachment portion towards a distal end region in a direction defining a longitudinal axis. The attachment portion includes a mounting aperture arrangement configured to couple with the oscillating power tool. The distal end region includes a distal end portion disposed generally opposite the attachment portion, and the distal end portion includes a cutting edge configured to perform a material-removing operation. A conduit extends from proximate the distal end portion towards the attachment portion and is configured to convey material removed during the material-removing operation to the vacuum system.

In some implementations, the conduit extends along a longitudinal direction defined by the longitudinal axis. In some implementations, the conduit extends generally parallel to the longitudinal axis. In some implementations, the conduit includes two channels in parallel. In some implementations, the conduit extends through the body. In some implementations, the conduit is formed integrally with the body. In some implementations, the conduit is formed by attachment of a channel member to the body. In some implementations, the conduit is defined as a separate piece from the body. For example, the conduit may include a hose, which may be a flexible hose. In some implementations, the conduit extends from proximate the distal end portion to an aperture, the aperture configured to convey the material to the vacuum system. In some implementations, the conduit extends through the body and the aperture is disposed in the attachment portion. In some implementations, the distal end portion is removably coupled to the body such that the cutting edge is interchangeable. The distal end portion may be coupled to the body by way of a fastener. The distal end portion may be coupled to the body by an interlocking fit.

In another aspect, the disclosure provides a blade for use with an oscillating power tool and with a vacuum system for removing material. The blade includes an attachment portion and a body extending from the attachment portion towards a distal end region in a direction defining a longitudinal axis. The attachment portion includes a mounting aperture arrangement configured to couple with the oscillating power tool, the mounting aperture arrangement including at least one through hole. The distal end region includes a distal end portion disposed generally opposite the attachment portion, and the distal end portion includes a cutting edge configured to perform a material-removing operation. The attachment portion further includes a vacuum aperture in fluid communication with a conduit configured to convey material removed during the material-removing operation to the vacuum system.

Other aspects of the disclosure will become apparent by consideration of the detailed description and accompanying drawings.

DETAILED DESCRIPTION

Before any implementations of the disclosure are explained in detail, it is to be understood that the disclosure is not limited in its application to the details of construction and the arrangement of components set forth in the following description or illustrated in the following drawings. The disclosure is capable of other implementations and of being practiced or of being carried out in various ways. The terms “substantially”, “generally”, and “about” may be used herein to encompass both “exactly” and “approximately”.

Figure 1:
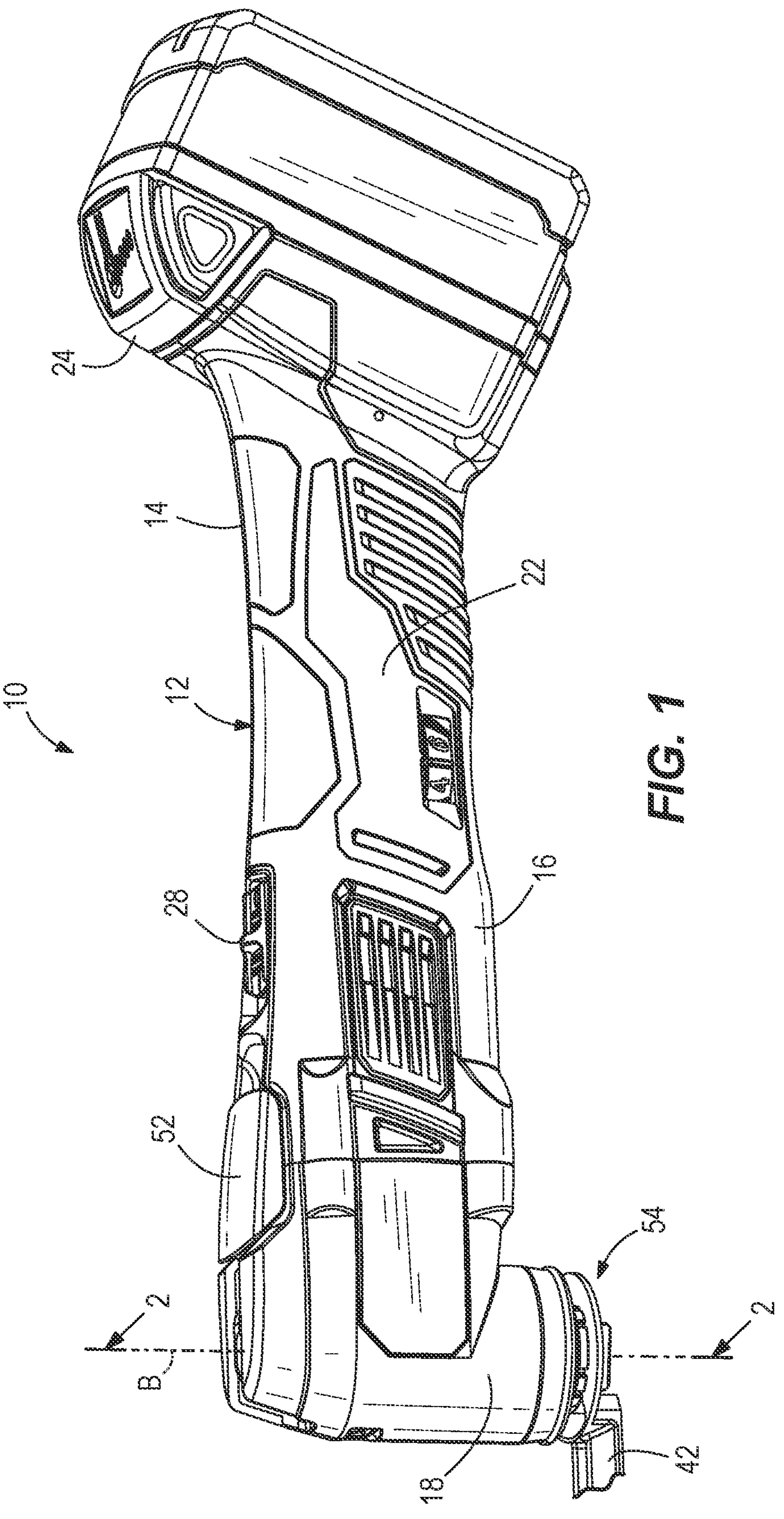
FIG. 1 is a side view of an oscillating power tool for receiving interchangeable working tools, such as blades.

FIG. 1 illustrates a power tool 10 according to one implementation of the disclosure. The power tool 10 includes a main body 12 having a housing 14 defining a handle 16 and a head 18. The head 18 is driven by a motor 20 (FIG. 2) disposed within the housing 14. The handle 16 includes a grip portion 22 providing a surface suitable for grasping by an operator to operate the power tool 10. The housing 14 generally encloses the motor 20.

The motor 20 in the illustrated implementation is an electric motor driven by a power source such as a battery pack 24 (FIG. 1), but may be powered by other power sources such as an AC power cord in other implementations. In yet other implementations, the power tool 10 may be pneumatically powered or powered by any other suitable power source and the motor 20 may be a pneumatic motor or other suitable type of motor. The motor 20 includes a motor drive shaft 26 (FIG. 2) extending therefrom and driven for rotation about a motor axis A. The motor 20 may be a variable speed or multi-speed motor. In other implementations, other suitable motors may be employed.

The battery pack 24 (FIG. 1) is a removable and rechargeable battery pack. In the illustrated implementation, the battery pack 24 may include a 12-volt battery pack, a 14.4-volt battery pack, an 18-volt battery pack, or any other suitable voltage, and includes Lithium-ion battery cells (not shown). Additionally or alternatively, the battery cells may have chemistries other than Lithium-ion such as, for example, Nickel Cadmium, Nickel Metal-Hydride, or the like. In other implementations, other suitable batteries and battery packs may be employed.

The main body 12 also includes a power actuator 28 (FIG. 1). The power actuator 28 is movably coupled with the housing 14 and is actuatable to power the motor 20, e.g., to electrically couple the battery pack 24 and the motor 20 to run the motor 20. The power actuator 28 may be a sliding actuator as shown, or in other implementations may include a trigger-style actuator, a button, a lever, a knob, etc.

Figure 2:
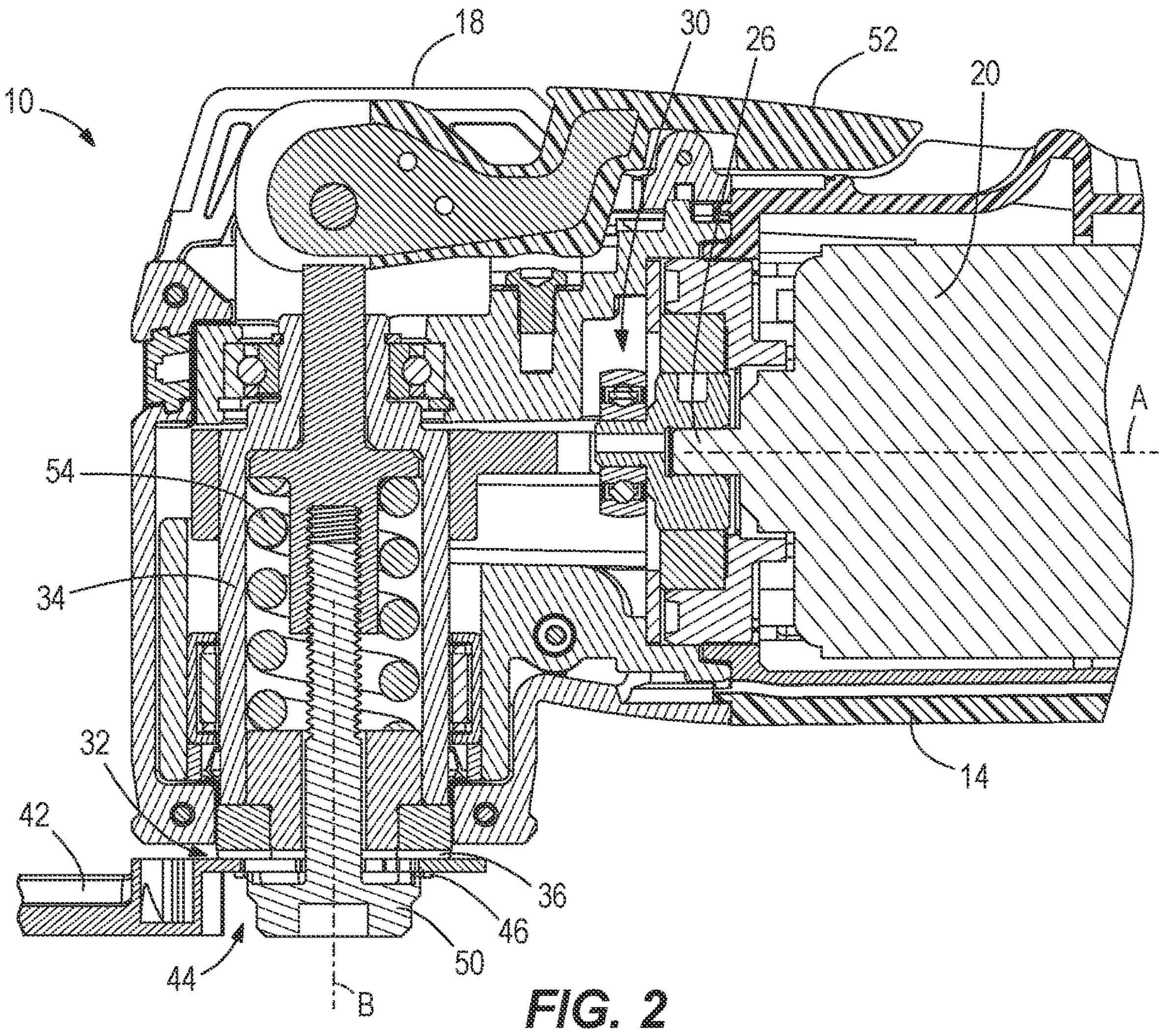
FIG. 2 is a side view cross-section of a head portion of the oscillating power tool of FIG. 1.

The housing 14 also houses a drive mechanism 30 (FIG. 2) for converting rotary motion of the motor drive shaft 26 into oscillating motion of an output mechanism 32. As shown in FIG. 2, the output mechanism 32 includes a spindle 34 having an accessory holder 36 disposed at a distal end thereof. As shown in FIG. 2, the spindle 34 terminates, at a free end, with the accessory holder 36. The accessory holder 36 is configured to receive an accessory (such as a blade 42 and/or any other attachment for the blade 42 and/or any other type of accessory) and a clamping mechanism 44 (FIG. 2) clamps the blade 42 to the accessory holder 36. Specifically, the accessory holder 36 includes a first locating feature 46, such as a protrusion or protrusions sized and shaped for receiving the blade 42. The clamping mechanism 44 includes a clamping flange 50 at a distal end thereof for clamping the blade 42 to the accessory holder 36 for oscillating motion with the spindle 34. A clamping actuator 52, such as a lever, is configured to apply and release a clamping force from a biasing member 54, such as a spring. The spindle 34 defines an oscillation axis B, substantially perpendicular to the motor axis A, about which the spindle 34 oscillates, as will be described in greater detail below. In other implementations, other clamping actuators may be employed, such as a button, a knob, etc.

Figure 3:
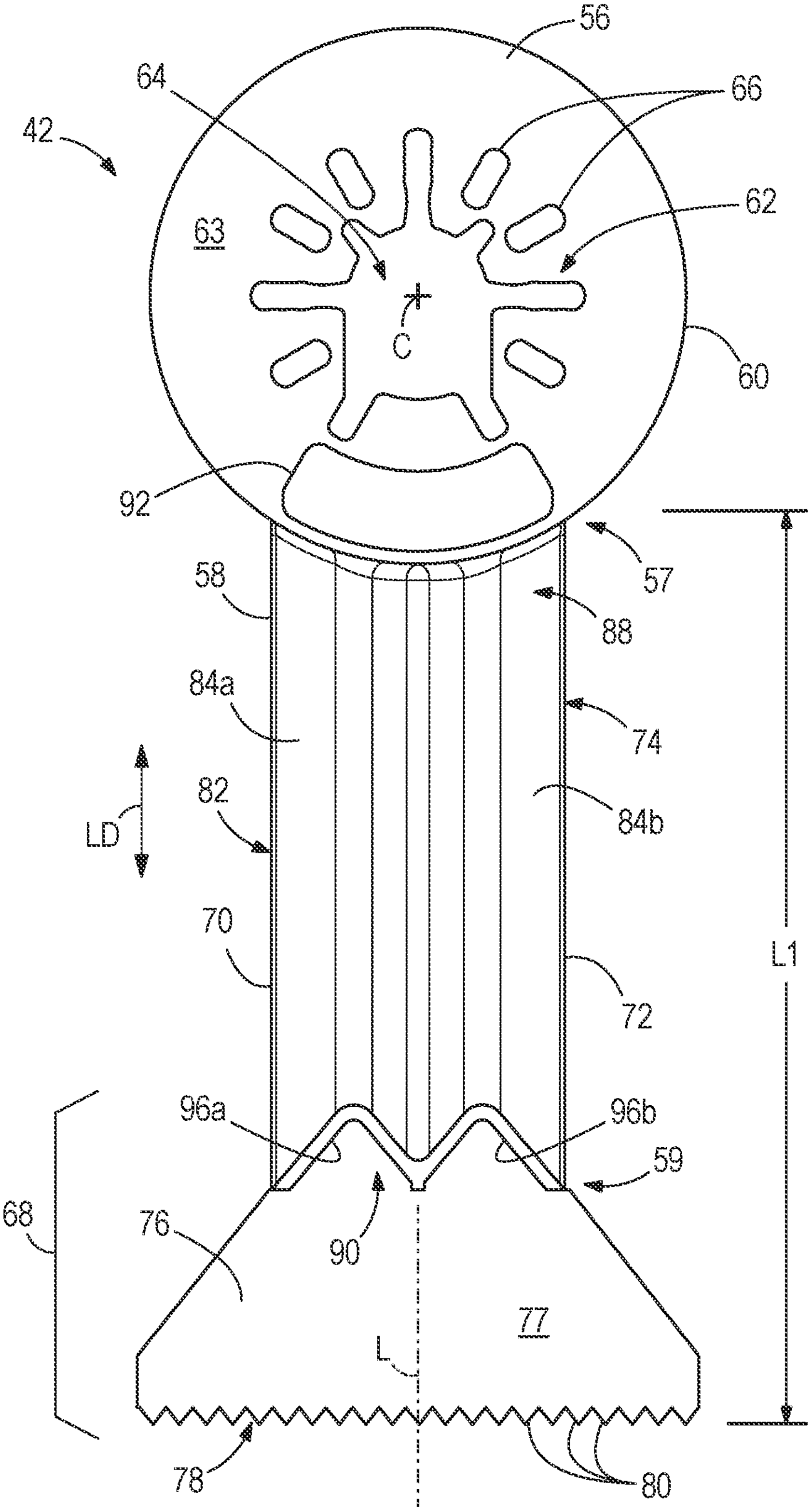
FIG. 3 is a top view of a blade attachable to the oscillating power tool of FIG. 1 according to one implementation of the disclosure.
Figure 4:
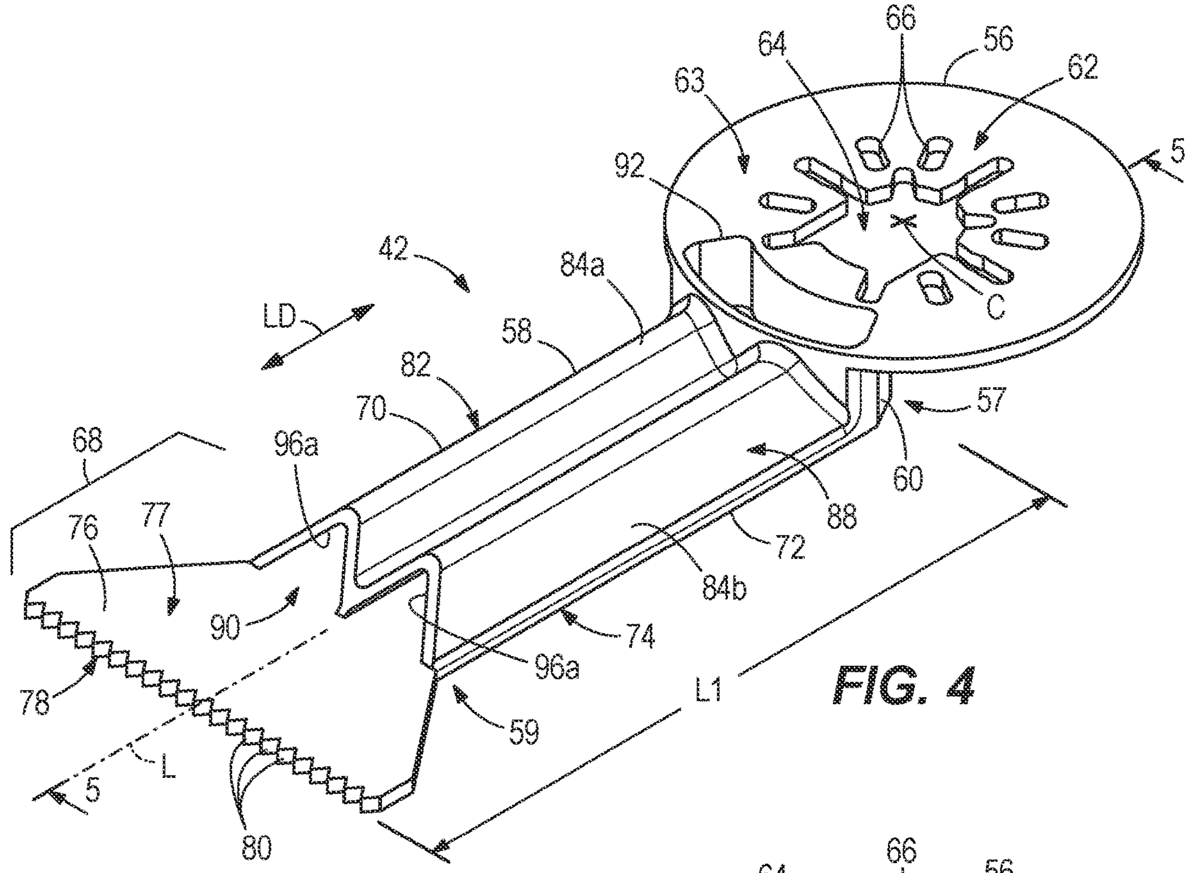
FIG. 4 is a perspective view of a blade attachable to the oscillating power tool of FIG. 1 according to one implementation of the disclosure.
Figure 5:
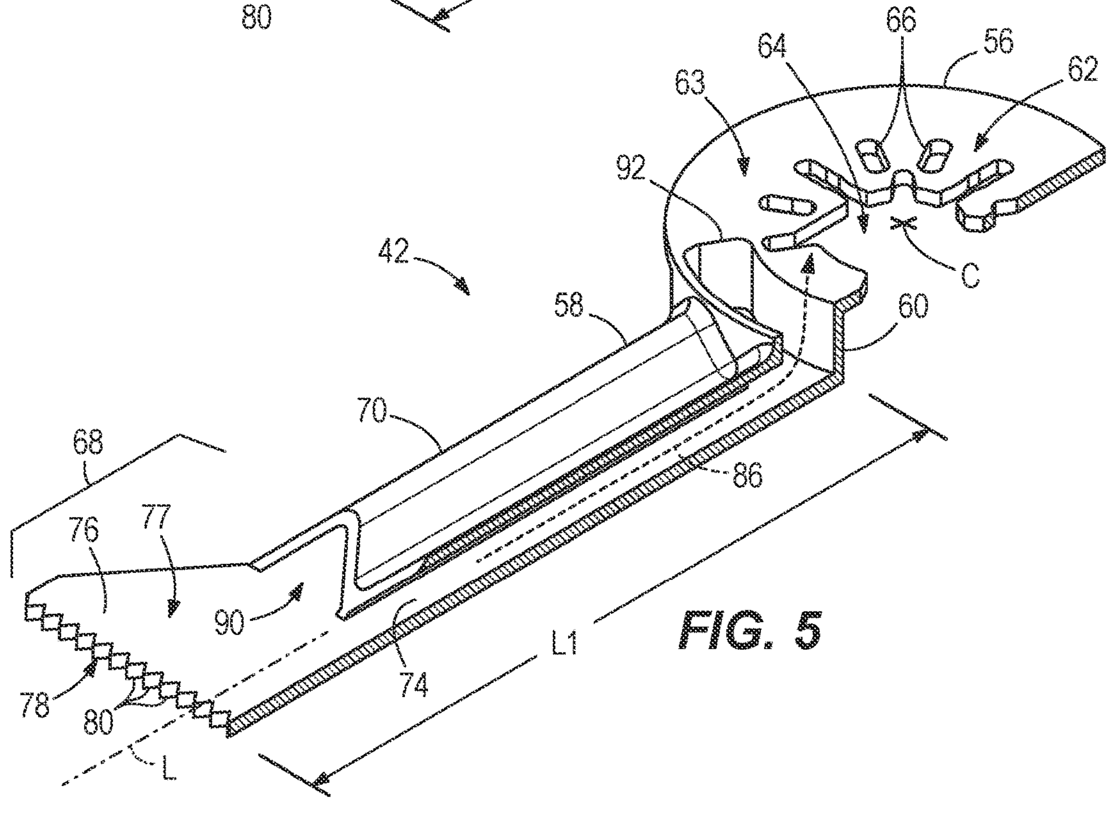
FIG. 5 is a cross-sectional perspective view of the blade shown in FIG. 4.

FIGS. 3-5 illustrate the blade 42 according to one implementation of the disclosure. The blade 42 is preferably formed from metal, which may include a metal, a metal alloy, a bi-metal, or any combination of metals, metal alloys, bi-metals, etc. For example, the metal may include hardened steel, carbide, etc. The blade 42 may be formed from other materials in other implementations. The blade 42 includes an attachment portion 56 and a body 58 (which may also be referred to herein, in some implementations, as an elongated body 58) extending from the attachment portion 56 along a longitudinal axis L in a fixed manner with respect to the attachment portion 56. The body 58 includes a step 60 and a base portion 74 offset from the attachment portion 56 in different planes, which are generally parallel. In the illustrated implementation, the body 58 has a generally elongated rectangular shape defining the longitudinal axis L. The body 58 may have other elongated shapes, such as wedge-shaped, arc-shaped, semi-circular, curved, dumbbell-shaped or bone-shaped, irregularly shaped, etc. In other implementations, the body 58 may have other shapes.

The attachment portion 56 includes a mounting aperture arrangement 62 configured to couple with the oscillating power tool 10 (e.g., as shown in FIGS. 1-2). The attachment portion 56 includes a generally planar mounting surface 63 having the mounting aperture arrangement 62 therein. The generally planar mounting surface 63 is generally parallel to the longitudinal axis L.

The mounting aperture arrangement 62 may have any shape(s) of aperture(s) suitable for coupling with the oscillating power tool 10 in a driving engagement. The mounting aperture arrangement 62 may include a central aperture 64 and a plurality of peripheral apertures 66 not in communication with the central aperture 64, as illustrated. The central aperture 64 may have any other shape in other implementations and any arrangement of peripheral apertures 66 may be employed. In some implementations, no peripheral apertures 66 need be employed. In some implementations, the peripheral apertures 66 may be in communication with the central aperture 64.

The attachment portion 56 is configured to engage with the clamping mechanism 44 to securely and releasably connect the blade 42 to the oscillating tool 10. The central aperture 64 may be closed, as shown in the illustrated implementation. In other implementations, the central aperture 64 may be an open aperture, e.g., a slot, open to an edge of the attachment portion 56. The central aperture 64 defines an anchor center C and is configured such that the anchor center C intersects the oscillation axis B, about which the blade 42 is configured to oscillate rotatingly, when attached to the oscillating tool 10. The blade 42 defines the longitudinal axis L disposed generally perpendicular to the oscillation axis B, the longitudinal axis L also intersecting the anchor center C and extending from the attachment portion 56 through the body 58.

The body 58 is elongated along the longitudinal axis L between a first end 57 and a second end 59. The body 58 extends from the attachment portion 56 in a direction defining the longitudinal axis L. The body 58 includes a distal end region 68 generally opposite the attachment portion 56, and first and second side edges 70, 72 extending between the attachment portion 56 and the distal end region 68. The first and second side edges 70, 72 are substantially straight in the illustrated implementation and substantially parallel, although in other implementations the first and second side edges 70, 72 may have other shapes, such as curved, arc-shaped, etc., and may have other angles/orientations (e.g., non-parallel, diverging, converging, bone-shaped, dumbbell-shaped, etc.). The attachment portion 56 is disposed proximate the first end 57 and the distal end region 68 is disposed proximate the second end 59, generally opposite the attachment portion 56.

The distal end region 68 includes a distal end portion 76 disposed generally opposite the attachment portion 56. The distal end portion 76 includes a generally planar surface 77 and a cutting edge 78 configured to perform a material-removing operation. For example, the cutting edge 78 may include teeth 80, as shown, or in other implementations may include a chamfered edge (e.g., a scraper), a coarse edge (e.g., a grinder), or other material-removing feature. A conduit 82 extends from proximate the distal end portion 76 (and proximate the cutting edge 78) towards the attachment portion 56 and is configured to convey material removed during the material-removing operation to a vacuum system 94 (shown in FIGS. 13-14 and described in greater detail below).

The conduit 82 extends along a longitudinal direction LD defined by the longitudinal axis L, extending either straight, mostly straight, or in a serpentine fashion along the longitudinal direction LD. As illustrated, the conduit 82 extends generally straight (either straight or mostly straight) and generally parallel to the longitudinal axis L and includes two channels 84*a*, 84*b* in parallel, though in other implementations the conduit 82 may include one, three, or more channels. In the illustrated implementation, the conduit 82 extends through the body 58, the conduit 82 defining a flow path 86 (FIGS. 4 and 14) for removed material to pass during the material-removing operation. As illustrated, the conduit 82 is formed integrally with the body 58. In other implementations, the conduit 82 may be formed by attachment of a channel member to the body, e.g., a channel portion 88 of the conduit 82 may be formed separately (the channel member) and attached to the base portion 74 of the conduit 82. The channel portion 88 may be formed of the same material as the body 58 or may be formed of a different material. In yet other implementations, the conduit 82 is formed entirely as a separate piece from the body 58. For example, in such implementations, the conduit 82 may include a hose (such as the hose of the vacuum system shown in FIG. 13), which may be a flexible or non-flexible hose or any other tubular structure or hollow structure. An end of the hose may be removably attached (e.g., clipped) proximate the distal end portion 76 (e.g., to the body 58 or the distal end portion 76) to suction removed material. In yet other implementations, the conduit 82 may be a collapsible conduit (e.g., telescoping, folding like an accordion, or the like) to accommodate depth cutting such that the distal end portion 76 plunges through the workpiece while the conduit 82 collapses. For example, in such implementations the channel portion 88 may be constructed in a collapsible fashion allowing the channel portion 88 to collapse while the base portion 74 is fixed with respect to the distal end portion 76 to stabilize the depth cut in the kerf, or the channel portion 88 may be formed separately from the body 58 to independently define the conduit 82 (e.g., as a collapsible hose).

The conduit 82 extends from an inlet aperture 90 disposed proximate the distal end portion 76 to an outlet aperture 92, the outlet aperture 92 configured to convey the material to the vacuum system 94. As illustrated, the inlet aperture 90 is disposed in the body 58 directly adjacent the distal end portion 76 and the outlet aperture 92 is disposed in the attachment portion 56. In other implementations, the inlet aperture 90 may be disposed in the distal end portion 76. It should be understood that the inlet aperture 90 includes two inlet openings 96*a*, 96*b* in the illustrated implementation but may include one, three, or more openings to correspond with the number of channels in such other implementations. Each inlet opening 96*a*, 96*b* has a triangular shape, corresponding with a triangular shape of the conduit 82; however, in other implementations, the inlet aperture 90 and the conduit 82 may have other shapes, such as circular, oval, arc-shaped, square, rectangular, other polygonal shapes, other curved or oblong shapes, and any combination thereof.

The outlet aperture 92 is formed in the attachment portion 56 and has an arcuate shape centered about the anchor center C, though in other implementations the outlet aperture 92 may define an arc having a center offset from the anchor center C, and in yet other implementations the outlet aperture 92 may have other shapes, such as circular, oval, square, rectangular, other polygonal shapes, other curved or oblong shapes, and any combination thereof. In other implementations, the outlet aperture 92 may be formed in the body 58.

The channels 84*a*, 84*b* converge at the outlet aperture 92, which is configured as a single opening in the illustrated implementation (as shown in FIG. 4), though in other constructions the outlet aperture 92 may include any number of outlet openings.

In the illustrated implementation of FIGS. 3-5, the body 58 and distal end portion 76 have an overall length L1 in the longitudinal direction LD of about 3.0 inches (+/−0.25 inches). In other implementations, the overall length may be between about 2.0 inches (+/−0.25 inches) to about 4.0 inches (+/−0.25 inches). In yet other implementations, the overall length may be between about 0.5 inches (+/−0.25 inches) to about 6.0 inches (+/−0.25 inches). In yet other implementations, the body 58 and/or the distal end portion 76 may have any suitable length, shorter or longer than described above. The overall length L1 may be applied to any of the implementations disclosed herein.

Figure 6:
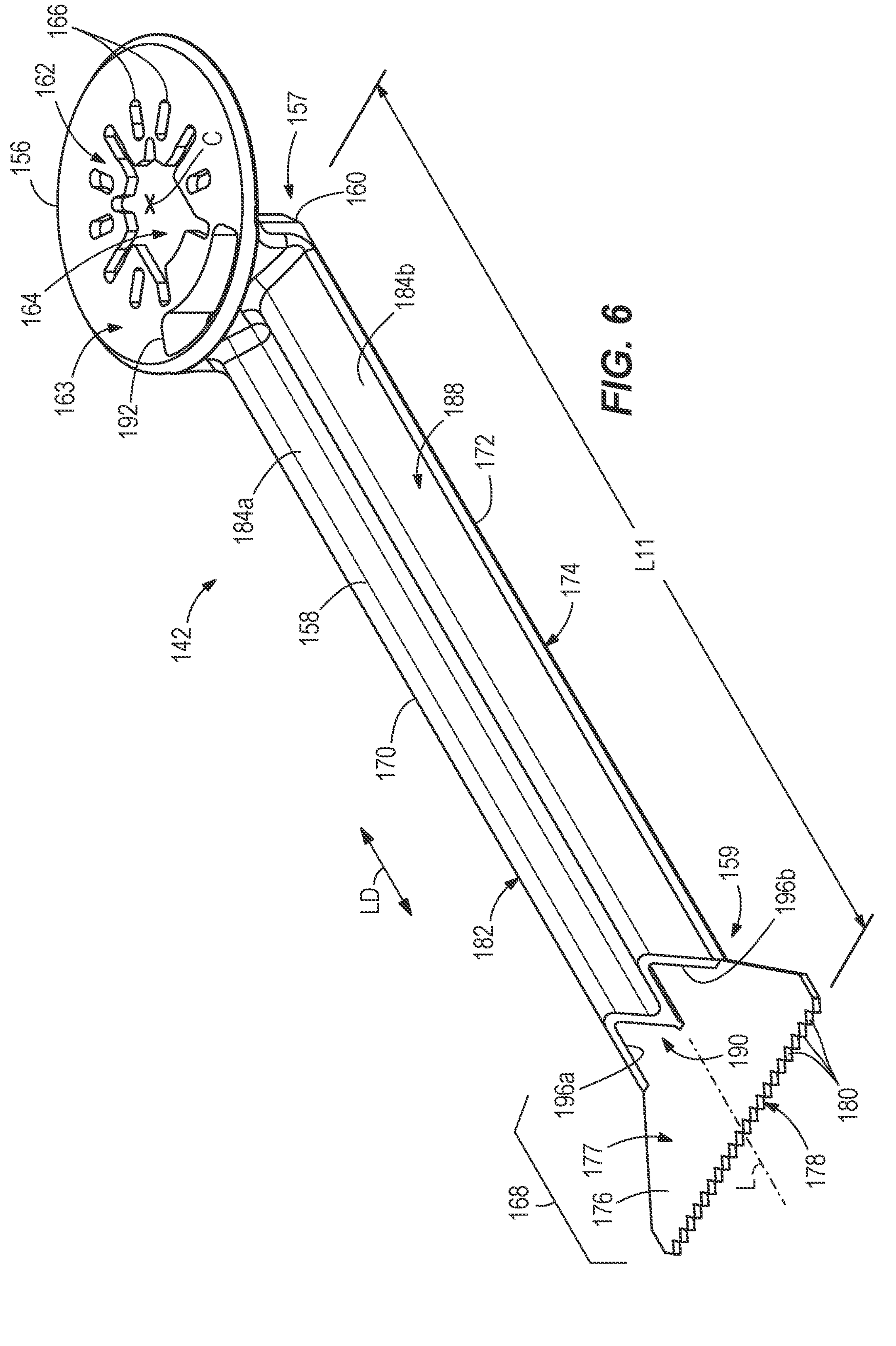
FIG. 6 is a perspective view of a variation of the blade of FIG. 4 according to another implementation of the disclosure.

For example, FIG. 6 illustrates another implementation of a blade 142 having a body 158 and distal end portion 176 with an overall length L11 in the longitudinal direction LD of about 5.8 inches (+/−0.25 inches). The blade 142 is otherwise the same as the blade 42 described herein. As such, description of the blade 42 applies to the blade 142 and, rather than duplicate description, reference is made to the description herein. Like reference numerals plus "100" are employed with respect to FIG. 6 and should be understood to be supported by description of the like reference numerals. The overall length L11 may be applied to any of the implementations disclosed herein.

Returning to the illustrated implementation of FIGS. 3-5, the base portion 74 of the body 58 and the distal end portion 76 are coplanar and formed integrally as one piece. However, in other implementations the distal end portion 76 may be formed separately and removably coupled to the body 58 so as to be interchangeable, such as the implementations illustrated in FIGS. 7-13, described below.

Specifically, FIGS. 7-10 illustrate a blade 242 having the distal end portion 276 removably coupled to the body 258 by way of an interlock 200. The blade 242 is otherwise the same as the blade 42 described herein. The differences are specifically described below. As such, description of the blade 42 applies to the blade 242 and, rather than duplicate description, reference is made to the description herein. Like reference numerals plus "200" are employed with respect to FIGS. 7-10 and should be understood to be supported by description of the like reference numerals, except where the differences are described below.

With reference to the implementation of FIGS. 7-10, the distal end portion 276 is removably coupled to the body 258 by the interlock 200. The body 258 includes barbs 201*a*, 201*b* projecting from the base portion 274 of the body 258 towards the channel portion 288 on opposite sides of the longitudinal axis L, proximate the side edges 270, 272. In the illustrated implementation, the barbs 201*a*, 201*b* are disposed proximate the inlet aperture 290 and inside the conduit 282. However, in other implementations, the barbs 201*a*, 201*b* may be disposed outside the conduit 282, e.g., in front of the inlet aperture 290. The barbs 201*a*, 201*b* each include a ramped surface 202*a*, 202*b* projecting from the base portion 274 of the body 258 and terminating at a back wall 203*a*, 203*b* dropping sharply to meet the base portion 274 of the body 258, such that the barbs 201*a*, 201*b* each have a wedge shape. In the illustrated implementation, two barbs 201*a*, 201*b* are employed; however, one, three, or more barbs may be employed in other implementations.

Figure 9:
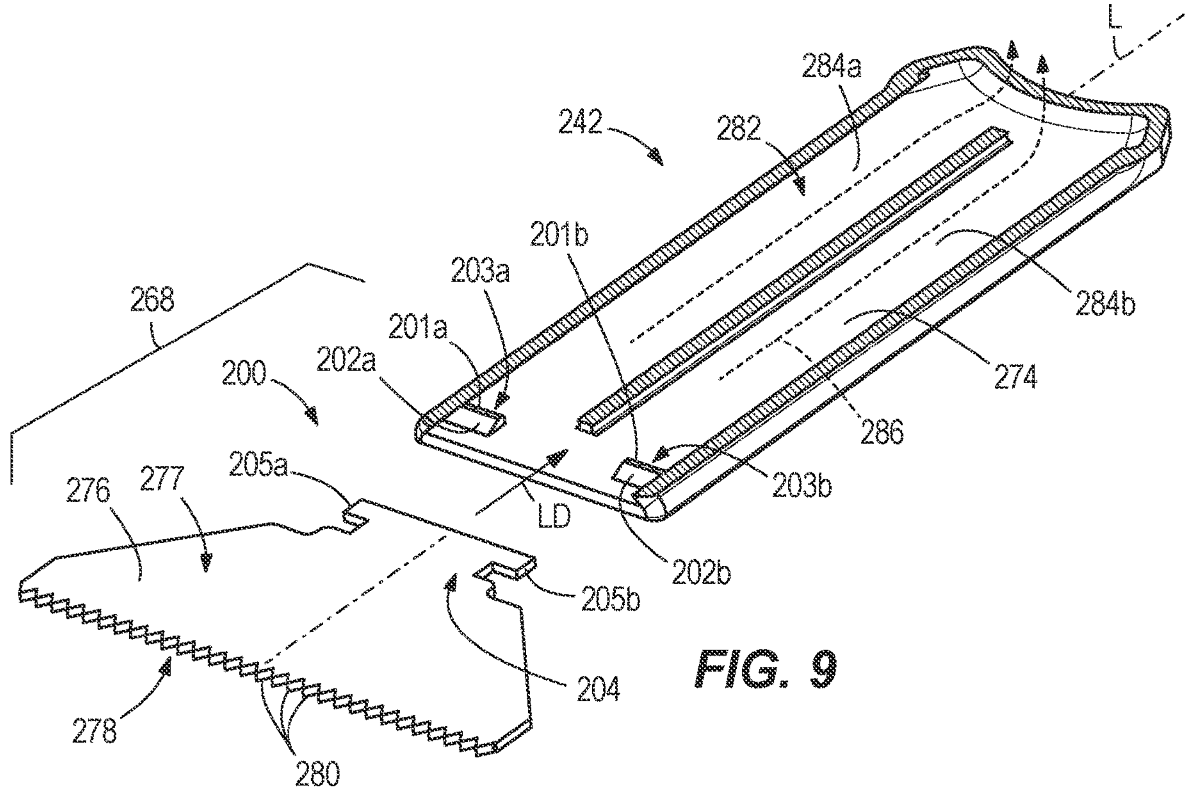
FIG. 9 is a cross-sectional perspective view of the portion of the blade of FIG. 7 and a distal end portion insertable therein.
Figure 10:
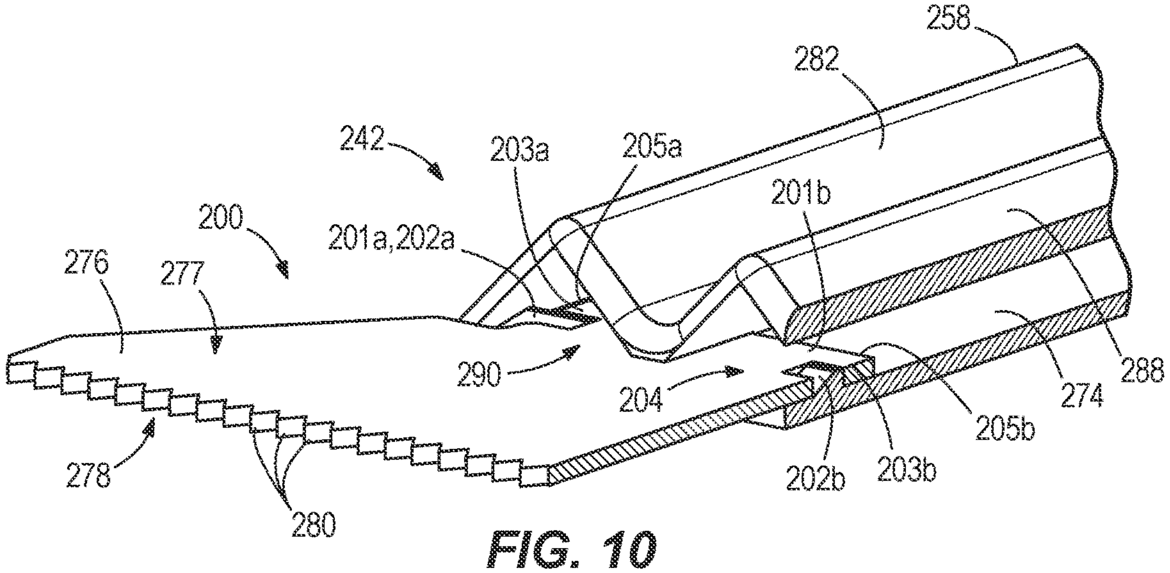
FIG. 10 is a perspective view of the portion of the blade of FIG. 7 with the distal end portion inserted therein.

As illustrated in FIGS. 9-10, the distal end portion 276, formed as a separate piece from the body 258, is generally planar and includes the generally planar surface 277 and the cutting edge 278. The distal end portion 276 also includes a T-shaped member 204 defining tangs 205*a*, 205*b* disposed opposite the cutting edge 278. The tangs 205*a*, 205*b* extend in a direction away from, and substantially perpendicular to, the longitudinal axis L, in opposite directions. As illustrated, two tangs 205*a*, 205*b* are employed. In other implementations, one, three, or more tangs may be employed with a corresponding number of barbs.

The distal end portion 276 is insertable into the body 258 in the longitudinal direction LD. The tangs 205*a*, 205*b* are configured to rise up the ramped surfaces 202*a*, 202*b* and then snap into place adjacent the back walls 203*a*, 203*b* of the barbs 201*a*, 201*b*. In other implementations, the distal end portion 276 may be removably coupled to the body 258 by other means, such as a snap fit, an interference fit, a latch, a detent, a fastener (as will be described in greater detail below with reference to FIGS. 11-13), etc.

Figure 7:
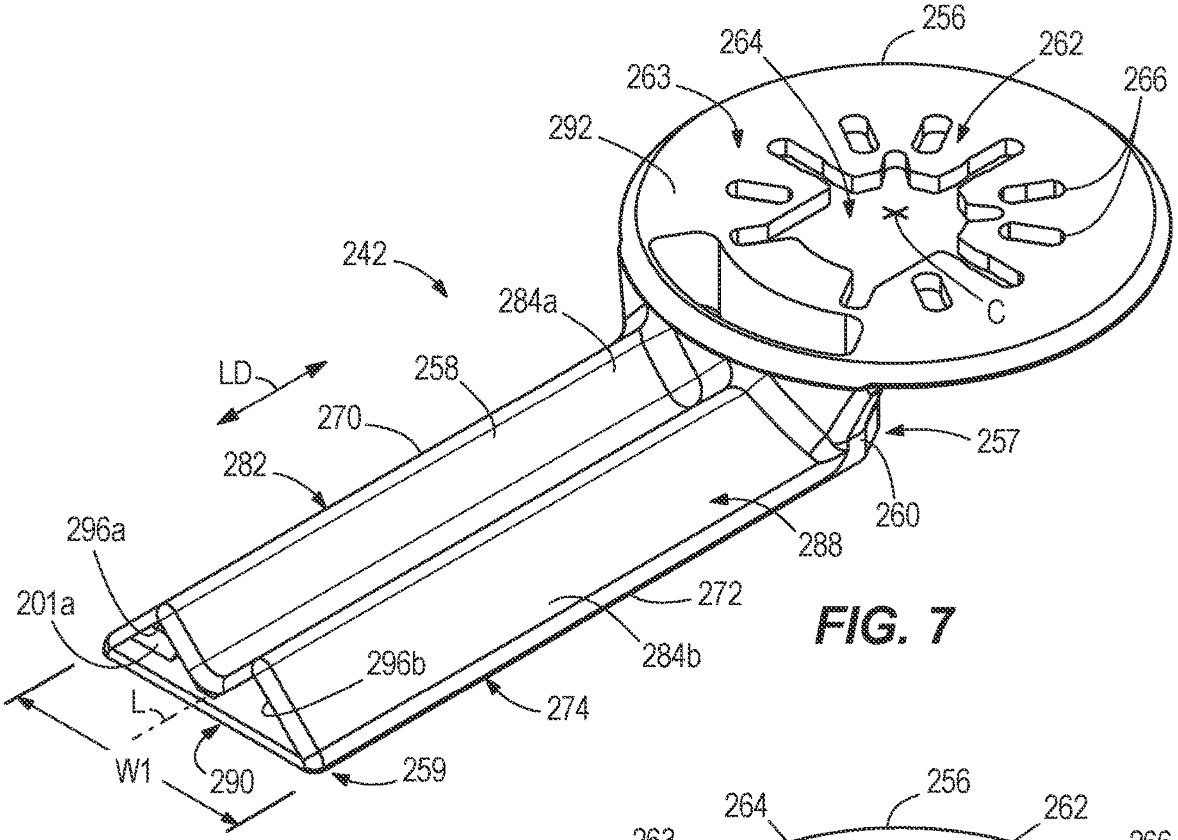
FIG. 7 is a perspective view of a portion of a blade attachable to the oscillating power tool of FIG. 1 according to yet another implementation of the disclosure.

As illustrated in FIG. 7, the body 258 may have a width W1 of about 0.9 inches (+/−0.1 inches). In other implementations, the width W1 may be between about 0.6 inches (+/−0.1 inches) to about 1.2 inches (+/−0.1 inches). In yet other implementations, the width W1 may be between about 0.3 inches (+/−0.1 inches) to about 2.0 inches (+/−0.1 inches). In yet other implementations, the body 258 may have any suitable width, shorter or longer than described above. The width W1 may describe any of the implementations disclosed herein.

Figure 8:
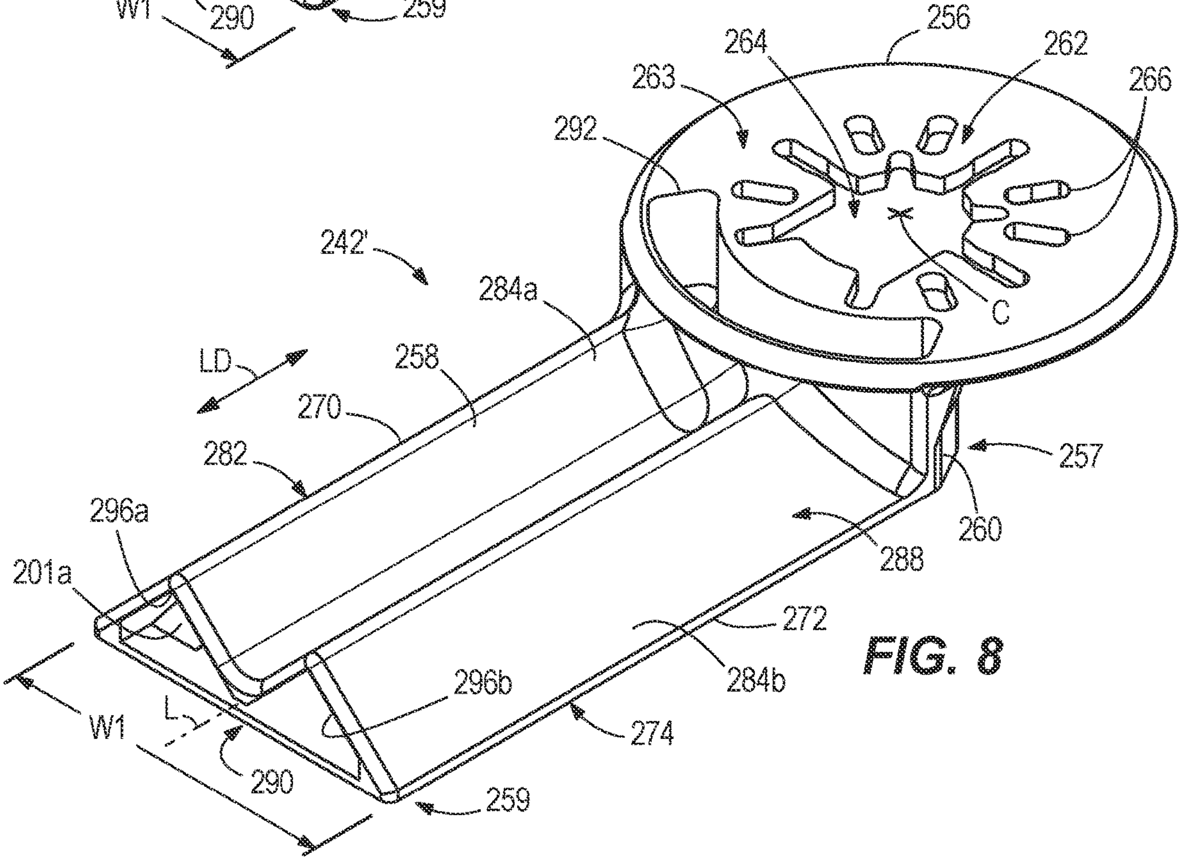
FIG. 8 is a perspective view of a variation of the portion of a blade of FIG. 7 according to yet another implementation of the disclosure.

For example, a variation of the blade 242 is shown in FIG. 8, in which a blade 242' has the width W1 of about 1.25 inches (+/−0.1 inches). The width W1 illustrated in FIG. 8 may also describe any of the implementations disclosed herein.

Figure 11:
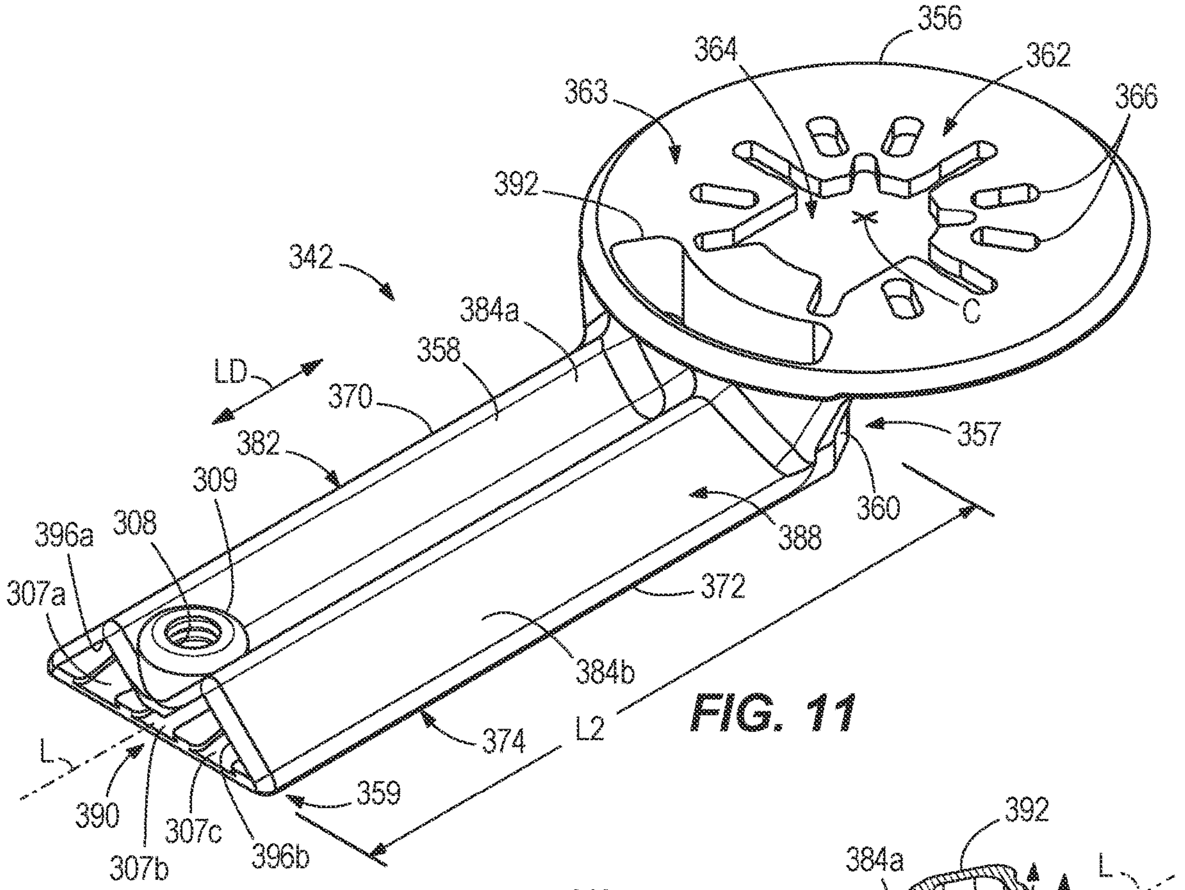
FIG. 11 is a perspective view of a portion of a blade attachable to the oscillating power tool of FIG. 1 according to yet another implementation of the disclosure.
Figure 12:
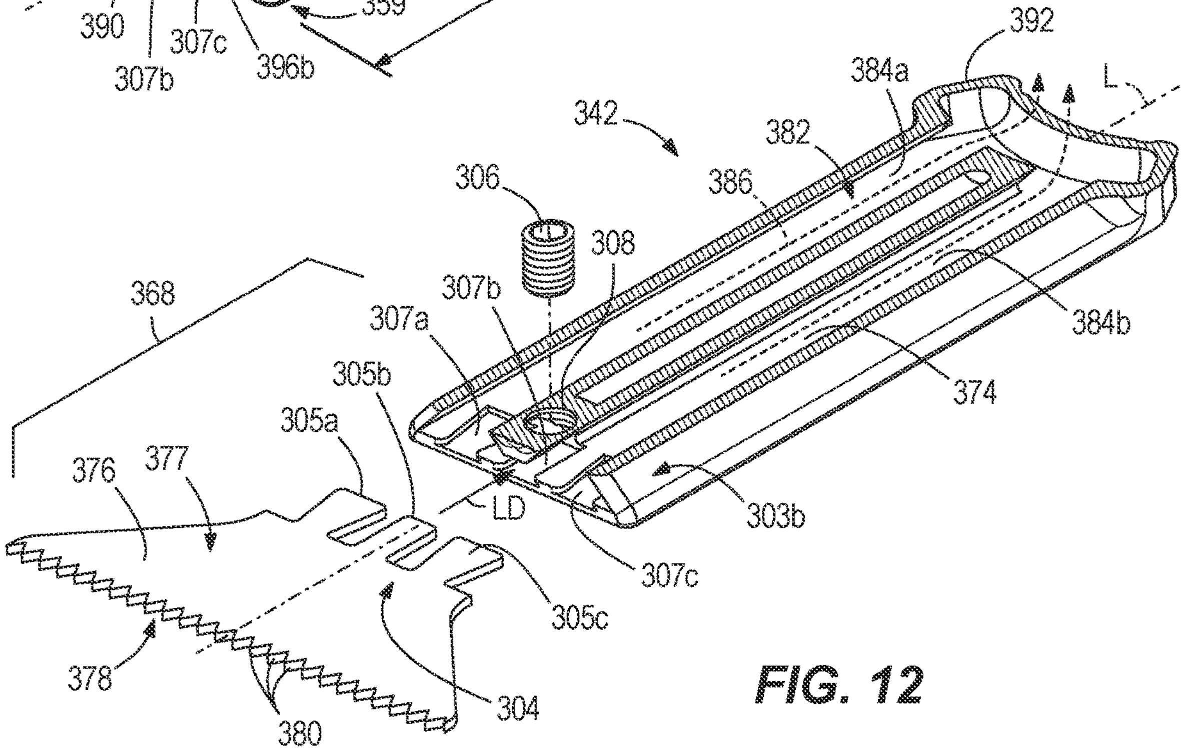
FIG. 12 is a cross-sectional perspective view of the portion of the blade of FIG. 11 and a distal end portion insertable therein.
Figure 13:
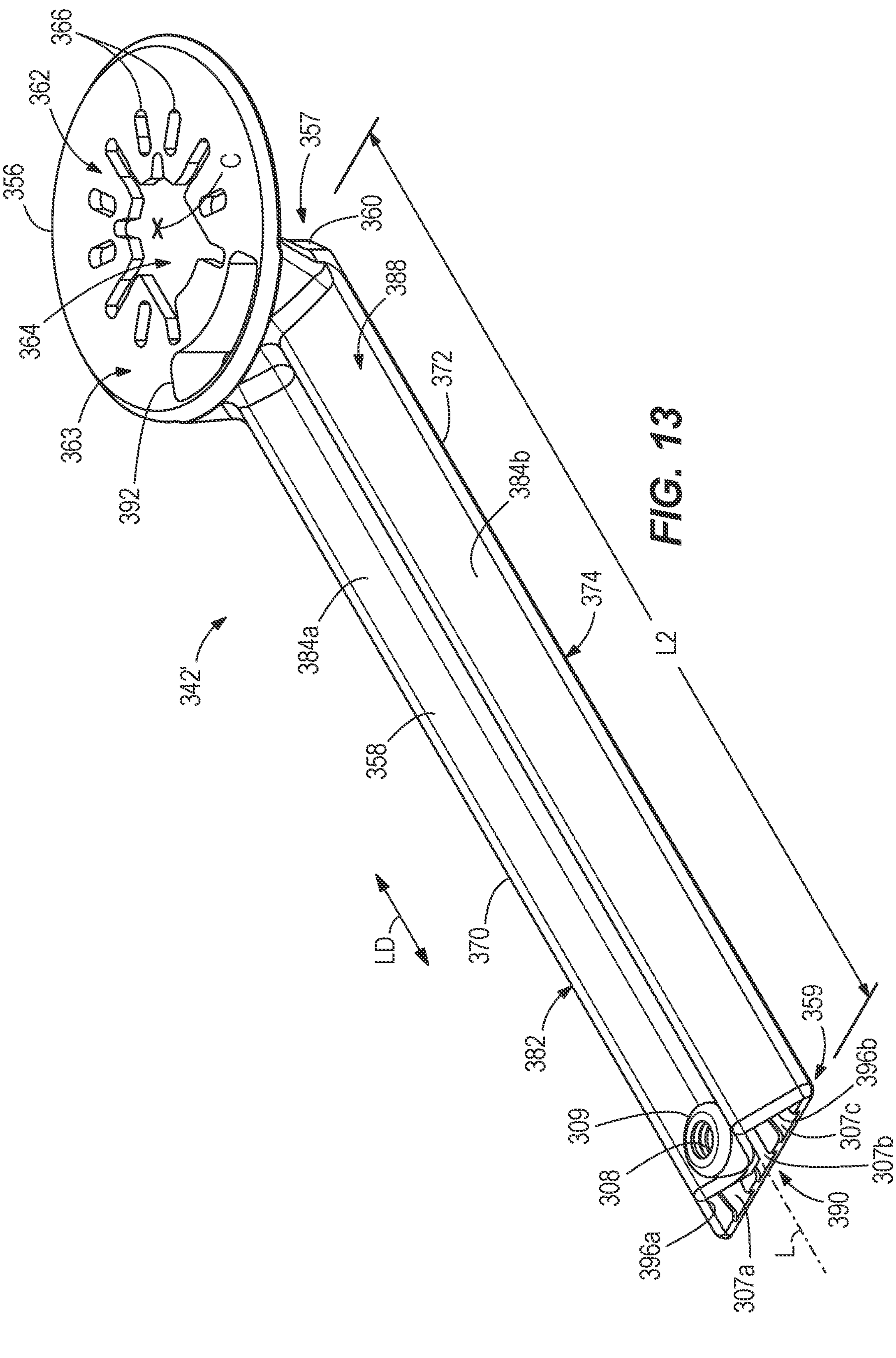
FIG. 13 is a perspective view of a variation of the blade of FIG. 11 according to another implementation of the disclosure.

FIGS. 11-13 illustrate another implementation of a blade 342 in which the distal end portion 376 is removably coupled to the body 358. The blade 342 is otherwise the same as the blade 42 described herein. The differences are specifically described below. As such, description of the blade 42 applies to the blade 342 and, rather than duplicate description, reference is made to the description herein. Like reference numerals plus "300" are employed with respect to FIGS. 11-13 and should be understood to be supported by description of the like reference numerals, except where the differences are described below.

The distal end portion 376 is removably coupled to the body 358 by way of a fastener 306 (FIG. 12). The body 358 includes recesses 307*a*, 307*b*, 307*c* in the base portion 374 of the body 358 configured to receive the distal end portion 376 as will be described in greater detail below. In the illustrated implementation, the recesses 307*a*, 307*b*, 307*c* are disposed proximate the inlet aperture 390 and inside the conduit 382. However, in other implementations, the recesses 307*a*, 307*b*, 307*c* may be disposed outside the conduit 382, e.g., in front of the inlet aperture 390. The recesses 307*a*, 307*b*, 307*c* each have a shallow rectangular shape recessed into the base portion 374. In the illustrated implementation, three recesses are employed; however, one, two, four, or more recesses may be employed in other implementations.

The body 358 also includes an internally-threaded through-hole 308, which may be formed in a boss 309 as illustrated in FIG. 11. The through-hole 308 extends through the body 358 and into the conduit 382, towards one of the recesses 307*b*, and is configured to receive the fastener 306 such as a threaded bolt (FIG. 12). In other implementations, other types of fasteners 306 may be employed, such as screws, nuts, clips, clamps, detents, springs, latches, etc. and any combination thereof.

As illustrated in FIG. 12, the distal end portion 376 is generally planar and includes the generally planar surface 377 and the cutting edge 378. The distal end portion 376 also includes an E-shaped member 304 defining tangs 305, 305*b*, 305*c* disposed opposite the cutting edge 378. The tangs 305, 305*b*, 305*c* extend generally in the longitudinal direction LD, parallel to each other. As illustrated, three tangs 305, 305*b*, 305*c* are employed. In other implementations, one, two, four, or more tangs may be employed with a corresponding number of recesses 307*a*, 307*b*, 307*c*.

The distal end portion 376 is insertable into the body 358 in the longitudinal direction LD. The tangs 305*a*, 305*b*, 305*c* are configured to be received in the recesses 307*a*, 307*b*, 307*c*, respectively. The fastener 306 is configured to engage one of the tangs 305*b* when tightened to clamp the distal end portion 376 to the body 358. The fastener 306 may be loosened to remove the distal end portion 376 from the body 358. In other implementations, the distal end portion 376 may be removably coupled to the body 358 by other means, such as a snap fit, an interference fit, a latch, a detent, etc.

As illustrated in FIG. 11, the body 358 may have a length L2 of about 2.5 inches (+/−0.25 inches). In other implementations, the length L2 may be between about 2.0 inches (+/−0.25 inches) to about 3.0 inches (+/−0.25 inches). In yet other implementations, the length L2 may be between about 0.5 inches (+/−0.25 inches) to about 6.0 inches (+/−0.25 inches). In yet other implementations, the body 358 may have any suitable length, shorter or longer than described above. The length L2 may apply to any of the implementations disclosed herein.

For example, a variation of the blade 342 is shown in FIG. 13, in which a blade 342' has the length L3 of about 5.2 inches (+/−0.25 inches). The length L3 illustrated in FIG. 13 may apply to any of the implementations disclosed herein.

Figure 14:
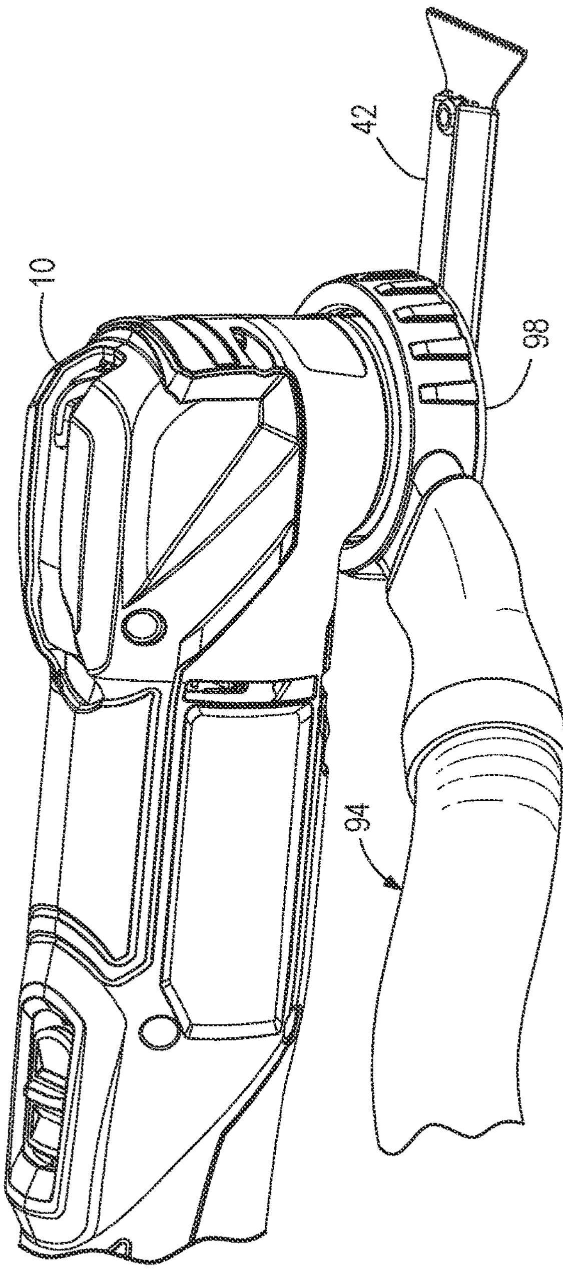
FIG. 14 is a perspective view of the power tool of FIG. 1 having the blade of FIG. 4, a vacuum shroud, and a vacuum system attached thereto.
Figure 15:
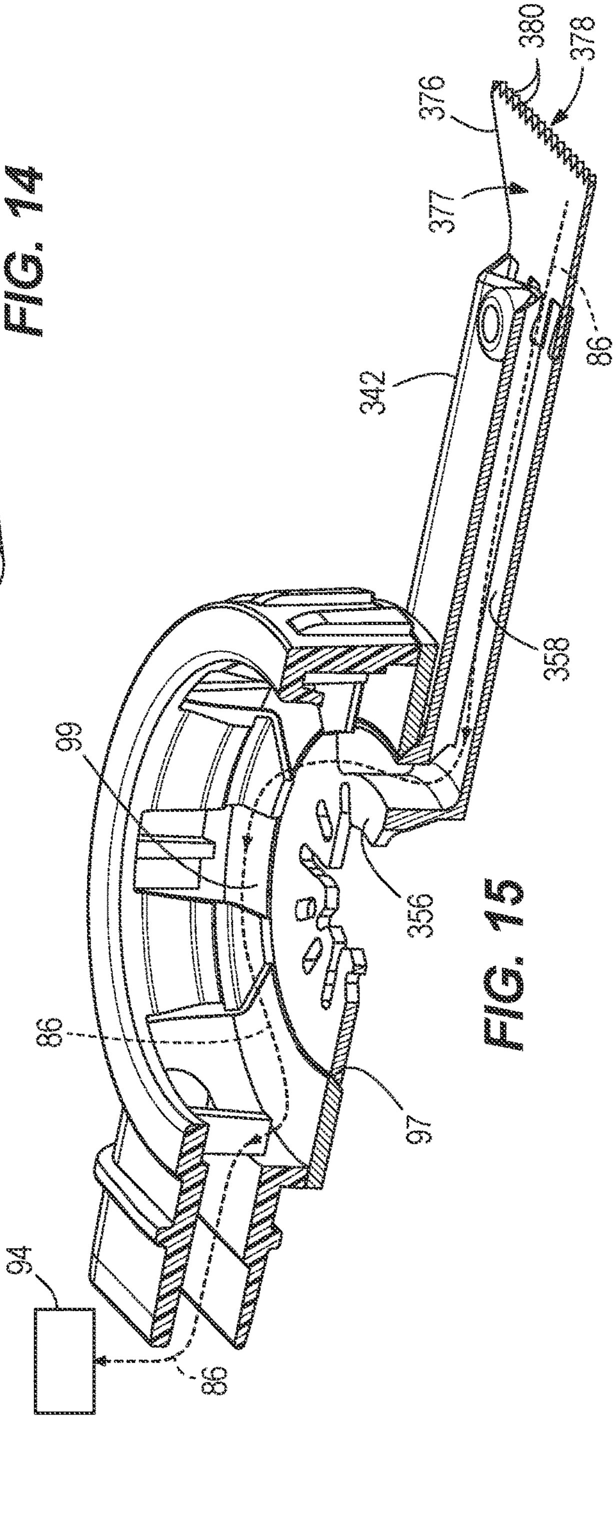
FIG. 15 is a cross-sectional perspective view of the blade of FIGS. 11-12 coupled with the vacuum shroud.
Figure 16:
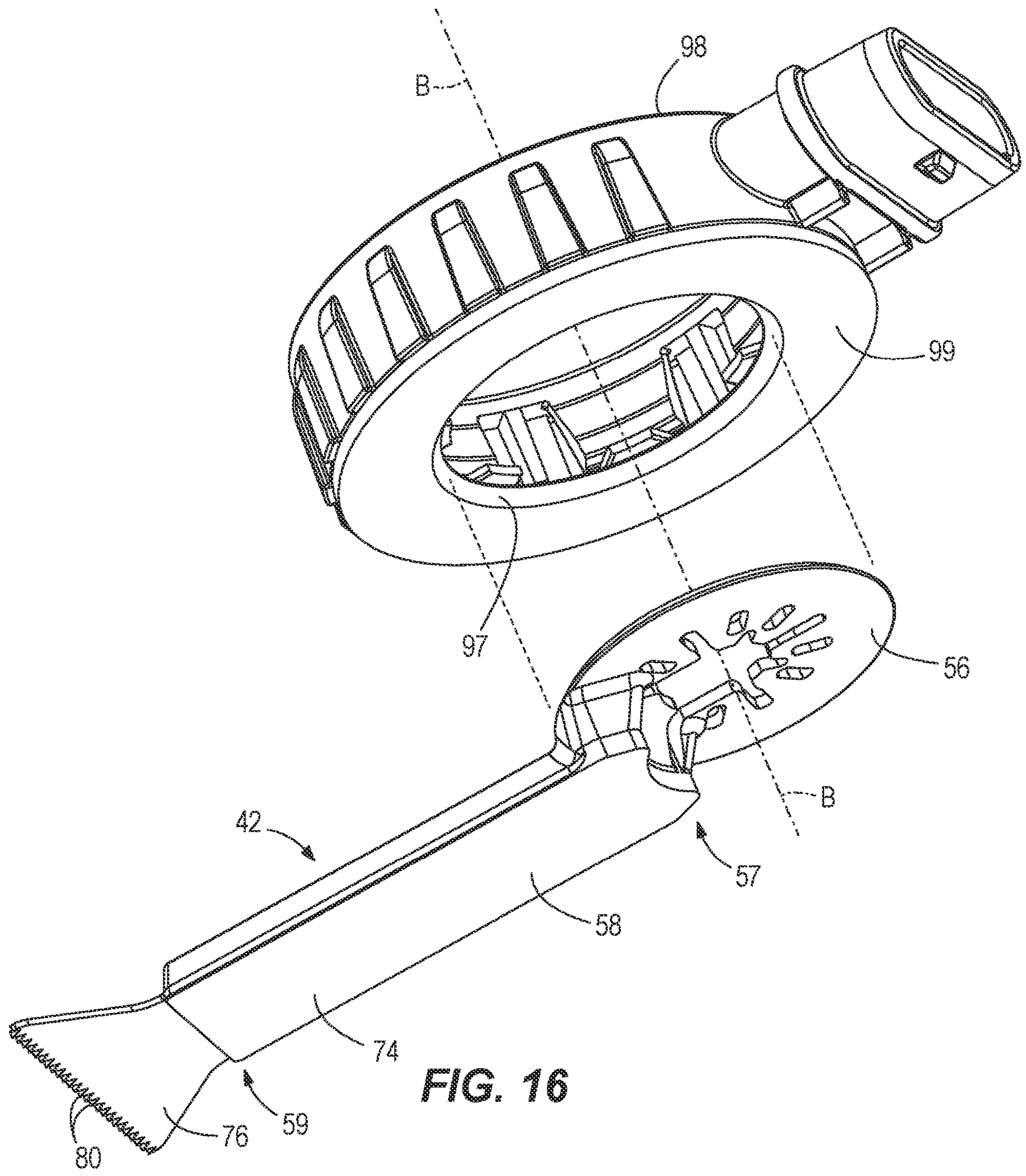
FIG. 16 is a bottom perspective view of the blade of FIG. 4 and the vacuum shroud of FIG. 13.
Figure 17:
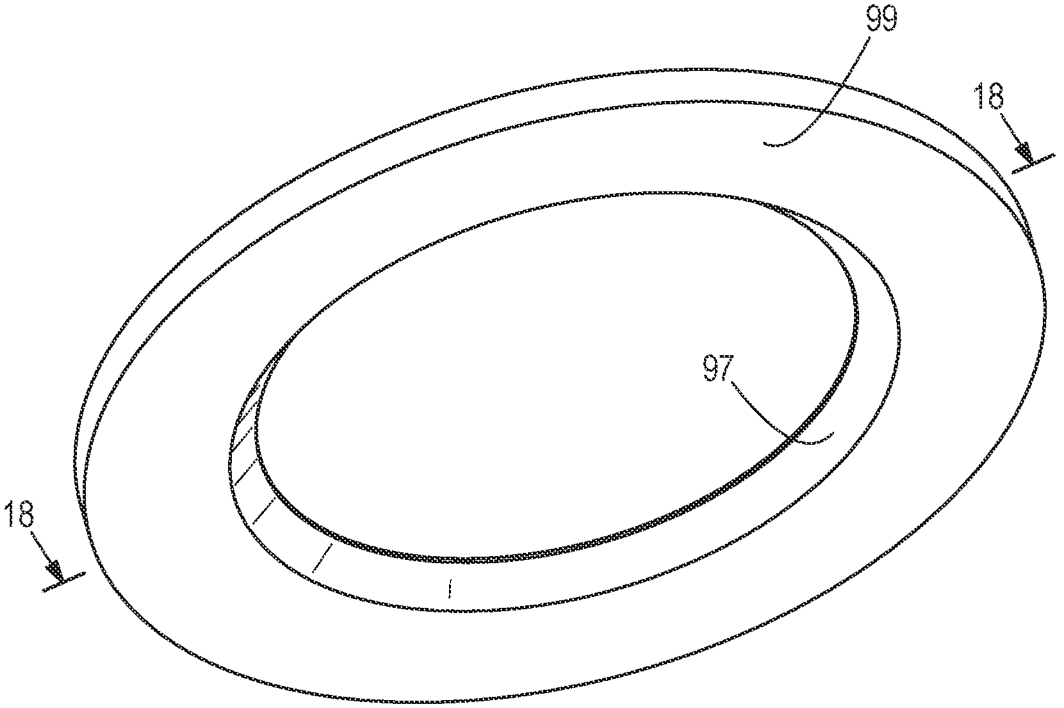
FIG. 17 is a bottom perspective view of an adapter of the vacuum shroud.
Figure 18:
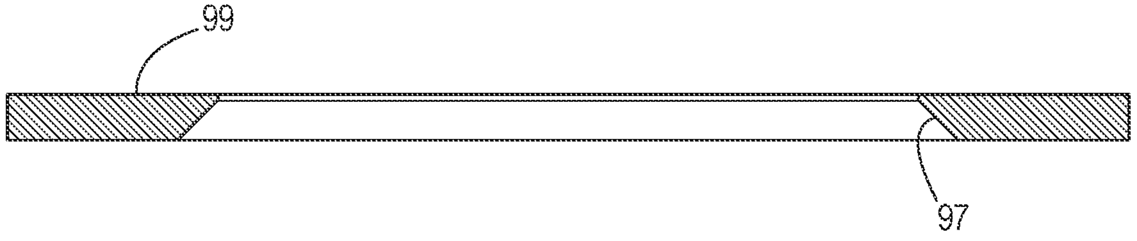
FIG. 18 is a cross sectional view of the adapter taken through line 18-18 in FIG. 17.

FIGS. 14-15 illustrates the blade 42 attached to the power tool 10, and a vacuum shroud 98 attached to the power tool 10 and creating a seal around the outlet aperture 92 of the blade 42. The blade 42 and vacuum shroud 98 are attached independently to the power tool 10. As shown in FIG. 16, the vacuum shroud 98 and attachment portion 56 are configured to attach to the power tool 10 coaxially with respect to the oscillation axis B. While the blade 42 is illustrated in FIG. 14 and the blade 342 is illustrated in FIG. 15, it should be understood that any of the blades 42, 142, 242, 342 and any of the alternatives disclosed herein can be employed with the vacuum shroud 98 in the same manner.

As illustrated in FIG. 15, the vacuum shroud 98 is configured to engage the attachment portion 56 when both are attached to the power tool 10 to create a seal around the outlet aperture 92. Together, the blade 42 and vacuum shroud 98 define the flow path 86 for air and removed material to pass from the distal end portion 76, into the inlet aperture 90, through the conduit 82, out the outlet aperture 92, into the vacuum shroud 98, and to the vacuum system 94.

An adapter 99, illustrated in FIGS. 15-18, may be removably coupleable with the vacuum shroud 98 to facilitate creation of the seal around the outlet aperture 92. The adapter 99 may be coupled by sandwiching between the vacuum shroud 98 and the blade 42 when the vacuum shroud 98 and the blade 42 are coupled to the power tool 10, or may be removably attachable in other implementations. The adapter 99 has an annular shape and includes a chamfered inner annular edge 97, best illustrated in FIGS. 17-18, configured to engage the attachment portion 56 around the outlet aperture 92 to create the seal. The adapter 99 may be formed of a compressible material, such as rubber or an elastomeric material. In other implementations, the adapter 99 may be formed integrally with the vacuum shroud 98.

In operation, an operator attaches the vacuum shroud 98, including the adapter 99, to the housing 14 of the power tool 10. Then, the operator attaches the blade 42 to the accessory holder 36 of the power tool 10, creating a seal between the blade 42 and the vacuum shroud 98. The operator grips the grip portion 22, actuates the power actuator 28 to oscillate the blade 42, and performs a material removing operation. During the material removing operation, removed material is generated proximate the cutting edge 78 of the distal end portion 76. A suction force at the inlet aperture 90, generated by the vacuum system 94, draws air and the removed material into the conduit 82, out the outlet aperture 92 and into the vacuum shroud 98, and to the vacuum system 94. The same or similar operation applies to the blades 142, 242, and 342.

Thus, the disclosure provides, among other things, an oscillating multi-tool blade having an integral conduit coupleable to a vacuum system for suctioning removed material from the cutting operation. Although the disclosure has been described in detail with reference to certain preferred implementations, variations and modifications exist within the scope and spirit of one or more independent aspects of the disclosure as described.

What is claimed is:

1. An accessory for use with an oscillating power tool, the accessory comprising:

- an attachment portion including a mounting aperture arrangement configured to couple with the oscillating power tool;
- a body extending away from the attachment portion in a longitudinal direction defining a longitudinal axis, the body including a step and a base portion offset from the attachment portion in different planes;
- a distal end portion including a generally planar surface and a cutting edge configured to perform a material-removing operation, the base portion of the body and the distal end portion being coplanar; and
- a conduit configured to convey material removed during the material-removing operation towards a vacuum system, the conduit having a conduit surface, the conduit surface coupled to the base portion and having a length extending parallel to the base portion in the longitudinal direction, the conduit having a height extending in a direction perpendicular to the longitudinal direction, the height extending greater than half of a height of the step and terminating adjacent the attachment portion, the conduit including a first end terminating proximate the cutting edge and a second end terminating at the step.

2. The accessory of claim 1, wherein the body is elongated between a first end and a second end, wherein the attachment portion is disposed proximate the first end and the distal end portion is disposed proximate the second end.

3. The accessory of claim 1, wherein the conduit extends along the longitudinal direction.

4. The accessory of claim 1, wherein the conduit extends generally parallel to the longitudinal axis.

5. The accessory of claim 1, wherein the conduit includes two channels in parallel.

6. The accessory of claim 1, wherein the conduit extends through the body.

7. The accessory of claim 1, wherein the conduit is formed integrally with the body.

8. The accessory of claim 1, wherein the conduit is formed by attachment of a channel member to the body.

9. The accessory of claim 1, wherein the conduit is defined as a separate piece from the body.

10. The accessory of claim 9, wherein the conduit includes a hose.

11. The accessory of claim 1, wherein the conduit extends from proximate the cutting edge to a vacuum aperture, the vacuum aperture configured to convey the material to the vacuum system.

12. The accessory of claim 11, wherein the conduit extends through the body and the vacuum aperture is disposed in the attachment portion.

13. The accessory of claim 1, wherein the distal end portion is removably coupled to the body such that the cutting edge is interchangeable.

14. The accessory of claim 11, wherein the step includes an opening in fluid communication with the conduit and the vacuum aperture.

15. An accessory for use with an oscillating power tool, the accessory comprising:

an attachment portion including a mounting aperture arrangement configured to couple with the oscillating power tool, the attachment portion extending along a first plane;

a vacuum aperture;

a body extending from the attachment portion in a direction defining a longitudinal axis, the body including a step, and a base portion extending along a second plane, wherein the second plane is offset from the first plane;

a distal end region including a generally planar surface and a cutting edge configured to perform a material-removing operation, the generally planar surface extending along the second plane; and a conduit in fluid communication with the vacuum aperture and configured to convey material removed during the material-removing operation towards the vacuum aperture, the conduit including a conduit surface, the conduit surface coupled to the base portion and having a length extending parallel to the base portion in the longitudinal direction, the conduit having a height extending in a direction perpendicular to the longitudinal direction, the height extending greater than half of a height of the step and terminating adjacent the attachment portion, the conduit having a first end terminating proximate the cutting edge and a second end terminating at the step.

16. The accessory of claim 15, wherein the conduit extends through the body.

17. The accessory of claim 15, wherein the conduit is formed as a separate piece from the body.

18. An accessory for use with an oscillating power tool, the accessory comprising:

an elongated body defining a longitudinal axis extending between a first end and a second end, the elongated body including a base portion and a step extending from the base portion;

an attachment portion disposed proximate the first end and including a mounting aperture arrangement configured to couple with the oscillating power tool, the step separating and extending between the base portion and the attachment portion;

a distal end portion disposed proximate the second end generally opposite the attachment portion and including a cutting edge configured to perform a material-removing operation; and a conduit configured to convey material removed during the material-removing operation towards a vacuum system, the conduit having a conduit surface, the conduit surface coupled to the base portion and having a length extending parallel to the base portion in the longitudinal direction, the conduit having a height extending in a direction perpendicular to the longitudinal direction, the height extending greater than half of a height of the step and terminating adjacent the attachment portion, the conduit including a first end terminating proximate the cutting edge and a second end terminating at the step.

19. The accessory of claim 18, wherein the conduit extends through the elongated body.

20. The accessory of claim 18, wherein the conduit is formed as a separate piece from the elongated body.

* * * * *